United States Patent
Kim et al.

(10) Patent No.: US 11,428,862 B2
(45) Date of Patent: Aug. 30, 2022

(54) DISPLAY BACKLIGHT UNIT WITH LIGHTGUIDE HAVING FIRST AND SECOND PRISM PATTERNS

(71) Applicant: Samsung Display Co., Ltd., Yongin-si (KR)

(72) Inventors: Seul-Gi Kim, Seoul (KR); Yongkyu Kang, Hwaseong-Si (KR); Kang Woo Lee, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/261,578

(22) PCT Filed: Jun. 4, 2019

(86) PCT No.: PCT/KR2019/006693
§ 371 (c)(1),
(2) Date: Jan. 20, 2021

(87) PCT Pub. No.: WO2020/022637
PCT Pub. Date: Jan. 30, 2020

(65) Prior Publication Data
US 2021/0294022 A1    Sep. 23, 2021

(30) Foreign Application Priority Data
Jul. 24, 2018  (KR) .......................... 10-2018-0085942

(51) Int. Cl.
*G02F 1/13357* (2006.01)
*F21V 8/00* (2006.01)

(52) U.S. Cl.
CPC ......... *G02B 6/0068* (2013.01); *G02B 6/0036* (2013.01)

(58) Field of Classification Search
CPC ................ G02B 6/0016; G02B 6/0068; G02F 1/133615
See application file for complete search history.

(56) References Cited

U.S. PATENT DOCUMENTS 6,746,129 B2 * 6/2004 Ohkawa ............... G02B 6/0021
385/901
6,904,225 B2 * 6/2005 Tamura ................ G02B 6/0036
385/146

(Continued)

FOREIGN PATENT DOCUMENTS

KR    10-2011-0027185    3/2011
KR    10-2011-0041825    4/2011

(Continued)

OTHER PUBLICATIONS

International Search Report dated Sep. 17, 2019, in International Application No. PCT/KR2019/006693 (with English Translation).

*Primary Examiner* — Ismael Negron
(74) *Attorney, Agent, or Firm* — H.C. Park & Associates, PLC

(57) ABSTRACT

A display device includes a display panel for displaying an image; a light guide plate overlapping the display panel and having a light exit surface, a bottoms surface opposite to the light exit surface, and a plurality of edge surfaces; and a plurality of light sources spaced apart from each other and configured to project light into a first edge surface of the plurality of edge surfaces of the light guide plate. The bottom surface includes a plurality of diffusion parts defining an activation area adjacent to a second edge surface of the plurality of edge surfaces opposite to the first edge surface, and a plurality of functional pattern parts defining a pattern area adjacent to the first edge surface. The functional pattern parts overlap a space between adjacent light sources, (Continued)

respectively, when viewed in a first direction heading from the light source part to the first edge surface.

19 Claims, 15 Drawing Sheets

(56) References Cited

U.S. PATENT DOCUMENTS

| | | | | |
|---|---|---|---|---|
| 6,991,359 B2* | 1/2006 | Leu | ...................... | G02B 6/0043 |
| | | | | 362/346 |
| 7,139,048 B2* | 11/2006 | Han | ...................... | G02B 6/0021 |
| | | | | 349/62 |
| 7,478,939 B2* | 1/2009 | Lee | ...................... | G02B 6/0016 |
| | | | | 362/608 |
| 7,637,646 B2* | 12/2009 | Byun | ................... | G02B 6/0016 |
| | | | | 349/65 |
| 7,905,649 B2* | 3/2011 | Yang | .................... | G02B 6/0068 |
| | | | | 362/612 |
| 7,976,207 B2* | 7/2011 | Kim | ...................... | G02B 6/0036 |
| | | | | 362/600 |
| 8,366,308 B2* | 2/2013 | Chiu | .................... | G02B 6/0031 |
| | | | | 362/621 |
| 9,798,068 B2* | 10/2017 | Koike | .................... | G02B 6/009 |
| 9,891,367 B2* | 2/2018 | Kim | ...................... | G02B 6/0038 |
| 2004/0184257 A1* | 9/2004 | Huang | ................. | G02B 6/0043 |
| | | | | 362/613 |
| 2008/0025686 A1* | 1/2008 | Lee | ...................... | G02B 6/0061 |
| | | | | 385/146 |

FOREIGN PATENT DOCUMENTS

| | | |
|---|---|---|
| KR | 10-1066755 | 9/2011 |
| KR | 10-1211725 | 12/2012 |
| KR | 10-1240253 | 3/2013 |

* cited by examiner

DISPLAY BACKLIGHT UNIT WITH LIGHTGUIDE HAVING FIRST AND SECOND PRISM PATTERNS

CROSS-REFERENCE TO RELATED APPLICATIONS

This application is the National Stage of International Application No. PCT/KR2019/006693, filed on Jun. 4, 2019, and which claims priority from and the benefit of Korean Patent Application No. 10-2018-0085942, filed on Jul. 24, 2018, each of which is hereby incorporated by reference for all purposes as if fully set forth herein.

BACKGROUND

Field

Exemplary implementations of the invention relate generally to a backlight unit and a display device including the same and, more specifically, to a backlight unit having a light guide plate and a display device including the same.

Discussion of the Background

In general, a display device includes a display panel for displaying an image by using light and a backlight unit disposed behind the display panel and providing light to the display panel. The backlight unit may include a light source part for generating light and a light guide plate for guiding the light to the display panel. The light source is disposed adjacent to one side surface of the light guide plate and provides light to a light incident part that is defined by one side surface of the light guide plate.

The light provided to the light guide plate is totally reflected by a top surface of the light guide plate and transmitted to a light emitting part of the light guide plate, which is an opposite surface of the light incident part of the light guide plate. The totally-reflected light may be diffused by patterns disposed on a bottom surface of the light guide plate.

The above information disclosed in this Background section is only for understanding of the background of the inventive concepts, and, therefore, it may contain information that does not constitute prior art.

SUMMARY

Applicant discovered that a display device has a hot-spot phenomenon caused between light sources and from which an optical sheet is omitted.

Display devices including a backlight unit constructed according to the principles and exemplary implementations of the invention are capable for preventing the hot-spot phenomenon hot-spot phenomenon caused between the light sources and from which the optical sheet is omitted. Thus, as the luminance difference between one area of a light guide plate, which faces an area between light sources, and the one area of the light guide plate, which faces the light sources, decreases, the hot-spot phenomenon may improve. Also, as a diffusion pattern part and a functional pattern part for controlling the light direction are disposed on a bottom surface of the light guide plate, the optical sheet may be omitted. Thus, a slim display device may be provided.

Additional features of the inventive concepts will be set forth in the description which follows, and in part will be apparent from the description, or may be learned by practice of the inventive concepts.

According to an aspect of the invention, a display device according to an exemplary embodiment includes: a display panel configured to display an image; a backlight unit including a light guide plate having a light exit surface facing the display panel, a bottom surface opposed to the light exit surface, a light incident surface connecting the bottom surface and the light exit surface, and a light facing surface opposed to the light incident surface; and a light source part including a plurality of light sources configured to provide light to the light incident surface and spaced apart from each other, in which the bottom surface includes an activation area adjacent to the light facing surface and a pattern area adjacent to the light incident surface; a diffusion pattern parts disposed in the activation area; and a functional pattern part disposed in the pattern area, and the functional pattern part overlaps a spaced space between adjacent light sources when viewed in a first direction heading from the light source part to the light incident surface.

Each of the diffusion pattern parts may include a base layer brought into contact with the bottom surface and a plurality of first patterns each extending in the first direction and arranged in a second direction crossing the first direction, and each of the first patterns may have a protruding shape protruding in a third direction crossing each of the first and second directions from a virtual reference surface corresponding to a boundary between the base layer and the first patterns.

The protruding shape may be one of an elliptical shape and a triangular shape.

The first patterns may be spaced by a predetermined gap from each other, and a portion of the base layer between the first patterns may be exposed.

The functional pattern part may include a plurality of second patterns, and each of the second patterns may have the substantially same shape as each of the first patterns.

The display device may further include a normal pattern part disposed in the pattern area and extending from at least one of the diffusion pattern parts, and the normal pattern part may has a flat surface parallel to the reference surface.

The normal pattern part may overlap the light sources when viewed in the first direction from the light source part to the light incident surface.

A length in the second direction of each of the first patterns may gradually increase or decrease as moving in a direction from the light incident surface to the light facing surface.

Each of the diffusion pattern parts may have a bottom surface adjacent to the light incident surface, a top surface opposed to the bottom surface and adjacent to the light facing surface, and side surfaces connecting the bottom surface and the top surface, and each of the side surfaces may include a curved surface.

The functional pattern part may be provided in plurality, and the plurality of functional pattern parts may overlap the spaced space.

An overlapped area between the activation area and the display panel may be greater than that between the pattern area and the display panel in a plan view.

According to another aspect of the invention, a backlight unit includes: a light guide plate having a light exit surface through which light is outputted, a bottom surface opposed to the light exit surface, a light incident surface connecting the bottom surface and the light exit surface, a light facing surface opposed to the light incident surface, first and second side surfaces connecting the light incident surface and the light facing surface and opposed to each other, wherein the bottom surface includes an activation area and a pattern area adjacent to the activation area; a light source part including a plurality of light sources configured to provide light to the light incident surface and spaced apart from each other in one direction; a diffusion pattern part disposed in the activation area and including a plurality of first patterns each extending in one direction on the bottom surface and arranged in a cross direction crossing the one direction; and a functional pattern part disposed in the pattern area and including a plurality of second patterns, and the second patterns each extend in the one direction and are arranged in the cross direction.

The functional pattern part may not overlap the light sources when viewed in the cross direction from the light source part to the light incident surface.

Lengths of the second patterns in the one direction may gradually increase or decrease as moving in the cross direction.

The functional pattern part may be provided in plurality in one of spaced spaces between the light sources, and among the functional pattern parts, a first functional pattern part in which the lengths of the second patterns in the one direction gradually increase as moving in the cross direction and a second functional pattern part in which the lengths of the second patterns in the one direction gradually decrease as moving in the cross direction may be alternately arranged.

The functional pattern part may have a bottom surface adjacent to the light incident surface, a top surface opposed to the bottom surface and adjacent to the light facing surface, and side surfaces connecting the bottom surface and the top surface, and each of the side surfaces may include a curved surface.

Each of the first patterns may have a protruding shape in a vertical direction perpendicular to each of the one direction and the cross direction from a virtual reference surface defined in the diffusion pattern part.

The backlight unit may further include a normal pattern part disposed in the pattern area and extending from the diffusion pattern part, and the normal pattern part may has a flat surface parallel to the reference surface.

The protruding shape may has one of an elliptical shape and a triangular shape.

Each of the second patterns may have the substantially same shape as each of the first patterns.

According to another aspect of the invention, the functional pattern part including the prism shaped patterns is disposed on the bottom surface of the light guide plate facing the area between the light sources. The functional pattern part may vertically output the light incident thereto. Thus, the luminance of the one area of the light guide plate, which faces the area between the light sources, which has the relatively low luminance, may increase.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
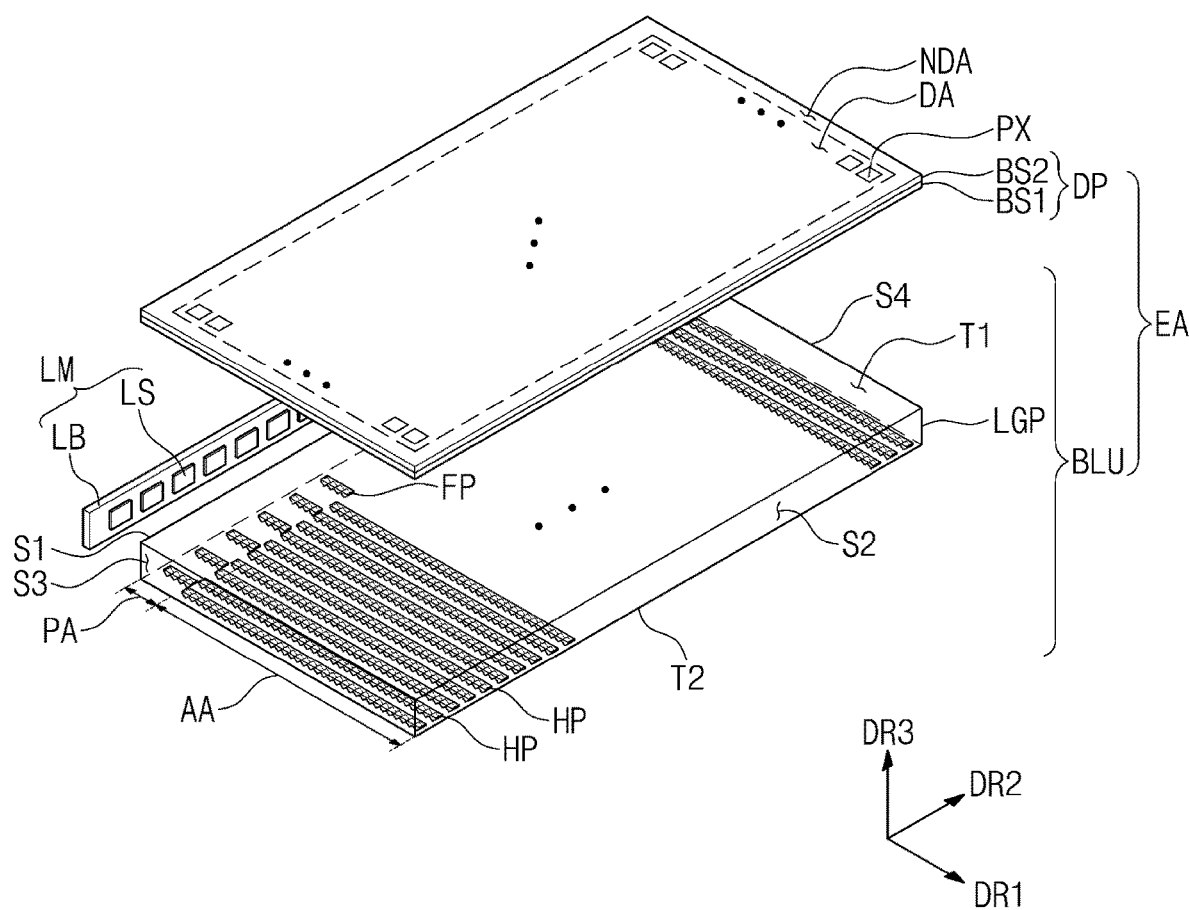
FIG. 1 is an exploded perspective view of an exemplary embodiment of a display device constructed according to the principles of the invention.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one exemplary embodiment can be referred to as a second element in another exemplary embodiment without departing from the scope of the appended claims. The terms of a singular form may include plural forms unless referred to the contrary.

Also, ""under", "below", "above', "upper", and the like are used for explaining relation association of components illustrated in the drawings. The terms may be a relative concept and described based on directions expressed in the drawings.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof. Hereinafter, exemplary embodiments will be described with reference to the accompanying drawings.

Figure 2:
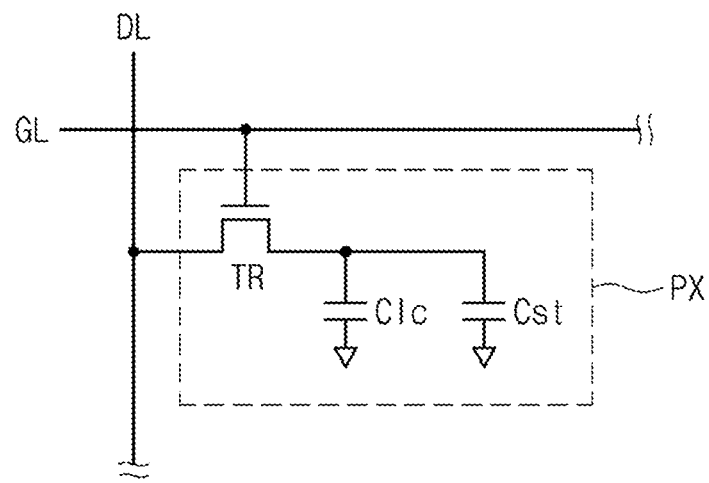
FIG. 2 is an equivalent circuit diagram of a representative pixel of the display device of FIG. 1.
Figure 3:
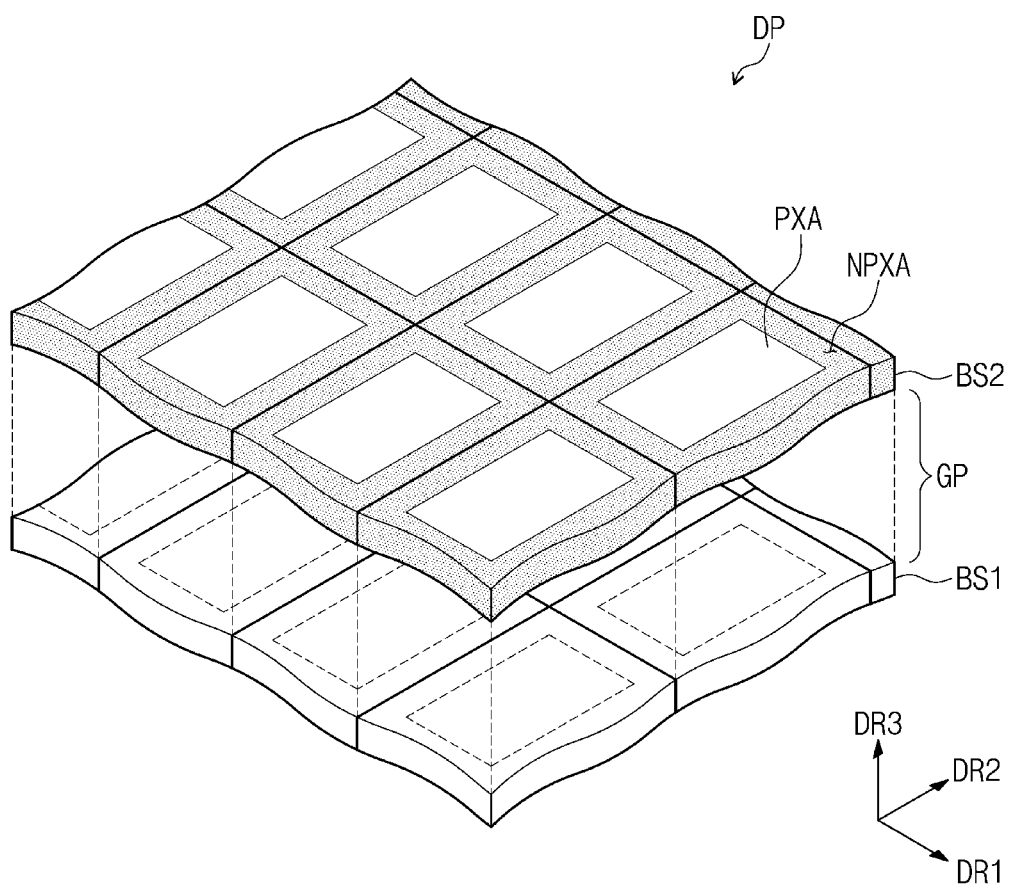
FIG. 3 is a perspective view of a display area of a display panel of the display device of FIG. 1.
Figure 4:
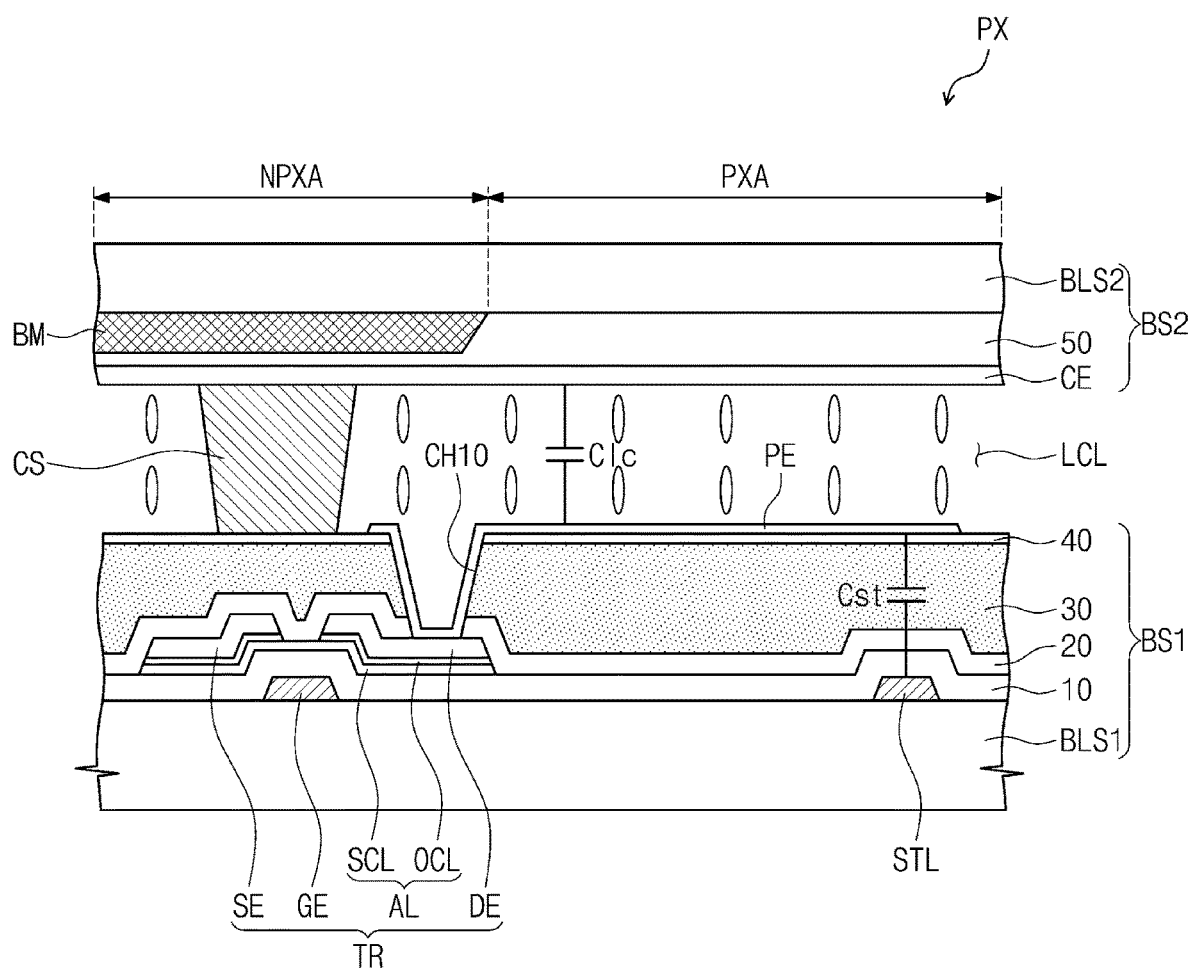
FIG. 4 is a cross-sectional view of the display area of the display panel of FIG. 3.

FIG. 1 is an exploded perspective view of an exemplary embodiment of a display device constructed according to the principles of the invention. FIG. 2 is an equivalent circuit diagram of a representative pixel of the display device of FIG. 1. FIG. 3 is a perspective view of a display area of the display panel of the display device of FIG. 1. FIG. 4 is a cross-sectional view of the display area of the display panel of FIG. 3. Hereinafter, the display device according to an exemplary embodiment will be described with reference to FIGS. 1, 2, 3, and 4.

Referring to FIG. 1, a display device EA includes a display panel DP and a backlight unit BLU. The display panel DP displays an image by using light received from the backlight unit BLU.

The display panel DP may be divided into a display area DA and a peripheral area NDA. The display area DA may be an area on which an image is displayed. A plurality of pixels PX for generating an image may be disposed on the display area DA. The peripheral area NDA may surround the display area DA. A driving circuit or a driving line for driving the display area DA may be disposed on the peripheral area NDA.

For example, a portion of the peripheral area NDA of the display panel DP may be bent. Thus, a portion of the peripheral area NDA may face a front surface of the display device EA, and another portion of the peripheral area NDA may have a rear surface of the display device EA. Alternatively, the peripheral area NDA may be omitted from the display panel DP according to another exemplary embodiment.

The display panel DP may include various exemplary embodiments. For example, the display panel DP may be one of a liquid crystal display panel, a plasma display panel, an electrophoresis display panel, a micro electro mechanical system (MEMS) display panel, and an electrowetting display panel. The display panel DP according to an exemplary embodiment will be described as the liquid crystal panel.

FIG. 2 is an equivalent circuit diagram illustrating a representative pixel PX. The pixel PX includes a thin-film transistor TR, a liquid crystal capacitor Clc, and a storage capacitor Cst. The liquid crystal capacitor Clc may correspond to a display element, and the thin-film transistor TR and the storage capacitor Cst may be a pixel driving circuit. The number of each of the thin-film transistor TR and the storage capacitor Cst may be varied according to operation modes of the liquid crystal display panel.

The liquid crystal capacitor Clc charges a pixel voltage outputted from the thin-film transistor TR. Orientation of liquid crystal directors contained in a liquid crystal layer LCL may be changed according to an amount of electric charges charged in the liquid crystal capacitor Clc. In other words, the liquid crystal directors are controlled by an electric field formed between two electrodes of the liquid crystal capacitor Clc. According to the orientation of the liquid crystal directors, light incident to the liquid crystal layer may be transmitted or blocked.

The storage capacitor Cst is connected in parallel to the liquid crystal capacitor Clc. The storage capacitor Cst maintains the orientation of the liquid crystal directors during a predetermined period.

The transistor TR includes a control electrode GE connected to a gate line GL, an activation part AL overlapping the control electrode GE on a plane (e.g., in a vertical direction), an input electrode SE connected to a data line DL, and an output electrode DE spaced apart from the input electrode SE (e.g., in a horizontal direction).

The liquid crystal capacitor Clc includes a pixel electrode PE and a common electrode CE. The storage capacitor Cst includes a pixel electrode PE and a portion of a storage line STL overlapping the pixel electrode PE.

FIG. 3 is a view partially illustrating a central portion of the display area DA. The display area DA may include transmission areas PXA and a peripheral area NPXA. The peripheral area NPXA may surround the transmission areas PXA and correspond to a boundary area of the transmission areas PXA. The transmission areas PXA may be arranged in the substantially same shape as the pixels PX.

The transmission areas PXA may substantially display a color and correspond to each of a transmission area of a transmissive display panel and a light emitting area of a light emitting display panel. The transmission areas PXA may be divided into a plurality of groups according to displayed colors. For example, the transmission areas PXA may display one of primary colors. The primary colors may include red, green, blue, and white.

The display panel DP includes a first substrate BS1 and a second substrate BS2. The second substrate BS2 is disposed on the first substrate BS1. For example, a predetermined gap GP may be defined between the first substrate BS1 and the second substrate BS2.

The predetermined gap GP is defined between the first substrate BS1 and the second substrate BS2. The pixels PX may be contained in one of the first substrate BS1 and the second substrate BS2, or one portion of the pixels may be contained in the first substrate BS1, and the other portion of the pixels PX may be contained in the second substrate BS2. The pixels PX are disposed between a first base substrate BLS1 of the first substrate BS1 and a second base substrate BLS2 of the second substrate BS2.

As illustrated in FIG. 4, the gate line GL and the storage line STL are disposed on one surface of the first base substrate BLS1. The control electrode GE is branched from the gate line GL. The gate line GL and the storage line STL may include metal such as aluminium (Al), silver (Ag), copper (Cu), molybdenum (Mo), chrome (Cr), tantalum (Ta), and titanium (Ti), or an alloy thereof. The gate line GL and the storage line STL may have a multi-layered structure including, e.g., a titanium layer and a copper layer.

The first base substrate BLS1 may be a glass substrate or a plastic substrate. A first insulation layer 10 covering the control electrode GE and the storage line STL is disposed on the one surface of the first base substrate BLS1. The first insulation layer 10 may include at least one of an inorganic material and an organic material. The first insulation layer 10 may include a silicon nitride layer, a silicon oxynitride layer, a silicon oxide layer, a titanium oxide layer, or an aluminum oxide layer. The first insulation layer 10 may have a multi-layered structure including, e.g., a silicon nitride layer and a silicon oxide layer.

The activation part AL overlapping the control electrode GE is disposed on the first insulation layer 10. The activation part AL may include a semiconductor layer SCL and an ohmic contact layer OCL. The semiconductor layer SCL is disposed on the first insulation layer 10, and the ohmic contact layer OCL is disposed on the semiconductor layer SCL.

The semiconductor layer SCL may include amorphous silicon or poly-silicon. Also, the semiconductor layer SCL may include a metal oxide semiconductor. The ohmic contact layer OCL may include a dopant that is doped with a density higher than that of the semiconductor layer. The ohmic contact layer OCL may include two portions spaced apart from each other. In an exemplary embodiment, the ohmic contact layer OCL may have an integrated shape.

The output electrode DE and the input electrode SE are disposed on the activation part AL. The output electrode DE and the input electrode SE are spaced apart from each other. Each of the output electrode DE and the input electrode SE partially overlaps the control electrode GE.

A second insulation layer 20 covering the activation part AL, the output electrode DE, and the input electrode SE is disposed on the first insulation layer 10. The second insulation layer 20 may include at least one of an inorganic material and an organic material. The second insulation layer 20 may include a silicon nitride layer, a silicon oxynitride layer, a silicon oxide layer, a titanium oxide layer, or an aluminum oxide layer. The second insulation layer 20 may have a multi-layered structure including, e.g., a silicon nitride layer and a silicon oxide layer.

A third insulation layer 30 is disposed on the second insulation layer 20. The third insulation layer 30 may be a single-layered organic layer providing a flat surface. In the exemplary embodiment, the third insulation layer 30 may include a plurality of color filters. The color filters completely or entirely cover at least the transmission area PXA (refer to FIG. 3). The color filters of the neighboring pixels may partially overlap each other in the peripheral area NPXA.

The plurality of color filters contained in the third insulation layer 30 may overlap the transmission areas PXA. The color filters may include color filters having at least two different colors. The color filters may be organic layers having red, green, and blue colors. Also, the color filters may have four or more colors, and some of neighboring color filters may have the substantially same color as each other. However, exemplary embodiments are not be limited thereto. For example, the color filters according to the exemplary embodiment may be varied.

A fourth insulation layer 40 is disposed on the third insulation layer 30. The fourth insulation layer 40 may be an inorganic layer covering the color filters. The fourth insulation layer 40 may include a silicon nitride layer, a silicon oxynitride layer, a silicon oxide layer, a titanium oxide layer, or an aluminum oxide layer. The fourth insulation layer 40 may have a multi-layered structure including, e.g., a silicon nitride layer and a silicon oxide layer.

The pixel electrode PE is disposed on the fourth insulation layer 40. The pixel electrode PE is connected to the output electrode DE through a contact hole CH10 passing through the second insulation layer 20, the third insulation layer 30, and the fourth insulation layer 40. An orientation layer covering the pixel electrode PE may be disposed on the fourth insulation layer 40.

The second base substrate BLS2 may be a glass substrate or a plastic substrate. A black matrix layer BM is disposed on a bottom surface of the second base substrate BLS2, which faces the first base substrate BLS1. The black matrix BM may have a shape corresponding to the peripheral area NPXA. The black matrix BM may partially overlap the display area DA (refer to FIG. 1). The black matrix BM absorbs light incident thereto. Thus, the black matrix BM may be an organic layer having a black color.

Insulation layers covering the black matrix layer BM is disposed on the bottom surface of the second base substrate BS2. In FIG. 4, a fifth insulation layer 50 providing a flat surface is exemplarily illustrated. The fifth insulation layer 50 may include an organic material.

The common electrode CE is disposed on the bottom surface of the second base substrate BS2. A common voltage is applied to the common electrode CE. The common voltage may have a value different from the pixel voltage. However, the cross-section of the pixel PX in FIG. 4 is merely illustrative, and exemplary embodiments are not limited thereto. Upper and lower positions of the first substrate BS1 and the second substrate BS2 may be changed.

Although the liquid crystal display panel in a vertical alignment mode is exemplarily described in this exemplary embodiment, a liquid crystal display panel in an in-plane switching (IPS) mode, a fringe-field switching (FFS) mode, a plane to line switching (PLS) mode, a super vertical alignment (SVA) mode, or a surface-stabilized vertical alignment (SS-VA) mode may be applied to the liquid crystal display panel.

A spacer CS may be disposed between the first substrate BS1 and the second substrate BS2. The spacer CS maintains the gap GP (refer to FIG. 3) between the first substrate BS1 and the second substrate BS2. The spacer CS may include a photosensitive organic material. The spacer CS overlaps the peripheral area NPXA (e.g., in a vertical direction). The spacer CS may overlap the thin-film transistor TR.

Referring to FIG. 1 again, the backlight unit BLU may be disposed below the display panel DP and provide light to the display panel DP. The backlight unit BLU includes a light source part LM, a light guide plate LGP, a diffusion pattern part HP, and a functional pattern part FP.

The light source part LM includes a circuit board LB and a light source LS. The circuit board LB is electrically connected to the light source LS to control light emitted from the light source LS. As illustrated in FIG. 1, the light source LS may be provided in plurality on the circuit board LB. The light source part LM according to the exemplary embodiment may be disposed at a side surface of the light guide plate 400. For example, the backlight unit BLU may be an edge-type backlight unit BLU.

For example, the circuit board LB may include a plurality of circuit boards corresponding to the plurality of light sources. For example, the circuit board LB may include a substrate and a circuit layer. The circuit layer is electrically connected to the light source LS. Specifically, the circuit layer may be connected to electrodes of the light source LS. The circuit layer may include conductive lines or conductive pads, which are connected to the electrodes, respectively. The circuit layer may be made of a metal material including, e.g., copper (Cu).

The light source LS may be electrically connected to the circuit layer. The light source LS may include a light emitting diode (LED) for generating light in response to an electrical signal received from the circuit layer.

The light emitting diode may have a structure in which a first electrode electrically connected to the circuit layer, a n-type semiconductor layer, an activation layer, a p-type semiconductor layer, and a second electrode opposed to the first electrode and electrically connected to the circuit layer are sequentially laminated with each other.

When a driving voltage is applied to the light emitting diode, an electron and a hole are coupled while moving, and light is generated by the coupling between the electron and the hole. The light source LS according to an exemplary embodiment may include a plurality of light emitting diodes, and light generated by each of the light emitting diodes may have a different color. However, exemplary embodiments are not limited thereto.

The light guide plate LGP includes a light exit surface T1, a bottom surface, and a plurality of side surfaces S1, S2, S3, and S4. The light guide plate LGP is disposed below the display panel DP. The light guide plate LGP guides light received from the light source part LM toward the display panel DP. In the exemplary embodiment, the light guide plate LGP may have a rectangular plate shape.

The light exit surface T1 may be defined as a surface facing the display panel DP. The bottom surface T2 may be opposed to the light exit surface T1. The plurality of side surfaces S1, S2, S3, and S4 (hereinafter, referred to as side surfaces) include first and second side surfaces S1 and S2 facing each other in the first direction DR1 and third and fourth side surfaces S3 and S4 facing each other in the second direction DR2 and connected to the first and second side surfaces S1 and S2.

According to an exemplary embodiment, at least one surface of the side surfaces S1, S2, S3, and S4 is defined as a light incident surface. The light incident surface faces the light source LS and receives light provided from the light source LS. FIG. 1 illustrates an exemplary embodiment in which the first side surface S1 is defined as the light incident surface.

The light guide plate LGP may provide light to the display panel 100 by guiding light incident to the light incident surface S1 and outputting the light through the light exit surface T1. However, this is merely illustrative, and the light incident surface S1 may be defined in one of the second to fourth side surfaces S2, S3, and S4 or in two or more side surfaces. However, the exemplary embodiment is not limited thereto.

The bottom surface T2 of the light guide plate LGP according to the exemplary embodiment includes an activation area AA and a pattern area PA. The activation area AA and the pattern area PA are arranged in the first direction DR1. The activation area AA and the pattern area PA may be adjacent to each other. The pattern area PA may be closer to the light incident surface S1 than the activation area AA. Thus, the activation area AA is closely adjacent to the light facing surface S2 more than the pattern area PA. When viewed in plan, an area in which the activation area AA overlaps the display panel DP may have a surface area greater than that of an area in which the pattern area PA overlaps the display panel DP.

The diffusion pattern part HP is disposed on the bottom surface T2. The diffusion pattern part HP may be disposed in the activation area AA of the bottom surface T2. The diffusion pattern part HP may extend in the first direction DR1. The diffusion pattern part HP may be provided in plurality, and the plurality of diffusion pattern parts HP may be spaced apart from each other in the second direction DR2. The diffusion pattern part HP includes a plurality of patterns. The diffusion pattern part HP may vertically (e.g., in the third direction DR3) output incident light by controlling a direction of the incident light. Thus, an optical sheet for vertical light output may be omitted to thereby reduce a thickness of the display device EA. Detailed explanation regarding the plurality of patterns will be described later.

The functional pattern part FP is disposed on the bottom surface T2. The functional pattern part FP is disposed in the pattern area PA of the bottom surface T2. The functional pattern part FP may extend in the first direction DR1. The functional pattern part FP may be provided in plurality, and the plurality of functional pattern parts FP may be spaced apart from each other in the second direction DR2. Each of the functional pattern parts FP may be disposed between the spaced light sources LS in a one-to-one corresponding manner. Thus, when viewed in a direction from the light source LS to the light incident surface S1 (i.e., when viewed in the first direction DR1 from the light source LS), the light source LS may not overlap the functional pattern part FP. The functional pattern part FP includes a plurality of patterns. Detailed explanation regarding the patterns will be described later.

In the edge-type backlight unit, light may be concentrated on one area of the light guide plate LGP, which faces the light source LS, more than one area of the light guide plate LGP, which does not face the light source LS. Thus, a hot-spot phenomenon may be generated in the display panel DP.

According to the exemplary embodiment, the functional pattern part FP is disposed on the one area of the light guide plate LGP, which does not face the light source LS (e.g., in the first direction DR1). The functional pattern part FP may increase luminance of one area of the light guide plate LGP, which faces an area between the light sources LS, which has relatively lower luminance of outputted light, by vertically outputting light provided from the light source LS. Thus, the hot-spot phenomenon recognized in the display panel DP may improve by reducing a luminance difference between light outputted to the one area of the light guide plate LGP (which faces the light source LS), and light outputted to the one area of the light guide plate LGP (which faces the area between the light sources LS).

Figure 5:
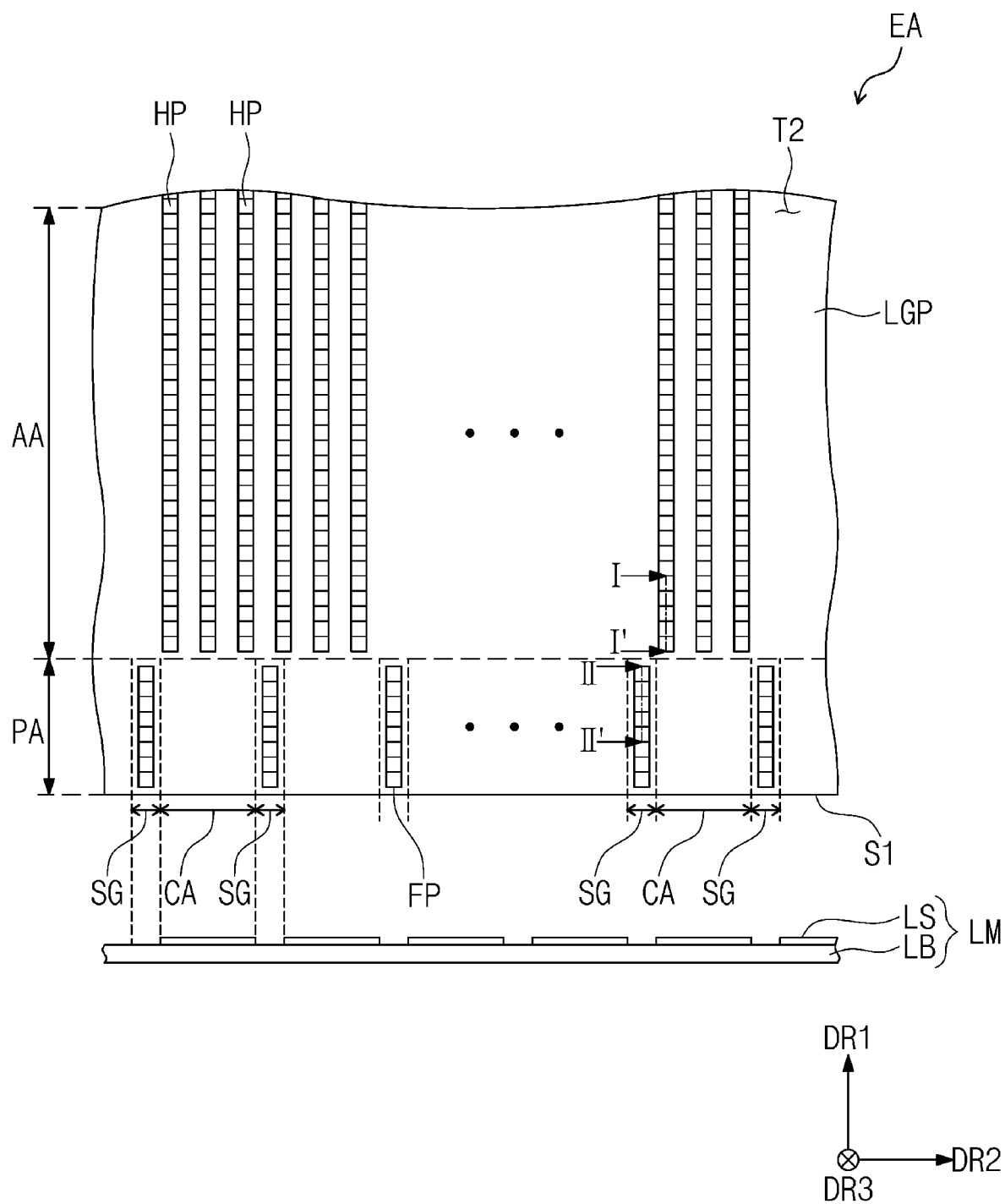
FIG. 5 is a rear view of the display device of FIG. 1.

FIG. 5 illustrates a portion of a rear surface of each of the light source part LM and the light guide plate LGP for convenience of explanation. The diffusion pattern part HP is disposed in the activation area AA. The diffusion pattern part HP may be provided in plurality, and the diffusion pattern parts HP may each extend in the first direction DR1 and be spaced apart from each other in the second direction DR2. Each of the diffusion pattern parts HP includes first patterns PT1.

The functional pattern part FP is disposed in the pattern area PA. The functional pattern part FP may be provided in plurality, and the functional pattern parts FP may each extend in the first direction DR1 and be spaced apart from each other in the second direction DR2. When viewed in the first direction DR1 from the light source LS to the light incident surface S1, the functional pattern part FP is disposed on a first area SG overlapping an area between the spaced light sources. Thus, the functional pattern part FP does not overlap a second area CA overlapping the light sources in the first direction DR1. Each of the functional pattern parts FP includes second patterns PT2. FIG. 5 illustrates the functional pattern parts FP each having a rectangular shape.

The diffusion pattern part HP and the functional pattern part FP according to the exemplary embodiment may be provided to the bottom surface T2 of the light guide plate LGP by an imprint process. Each of the diffusion pattern part HP and the functional pattern part FP may be made of a curable material used in the imprint process. However, exemplary embodiments are not limited thereto.

Figure 6A:
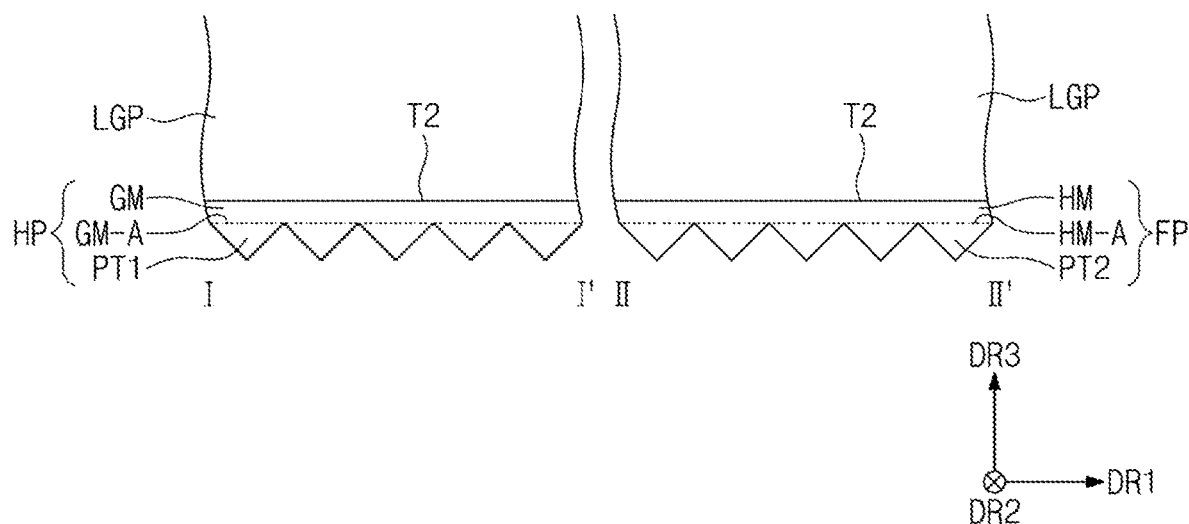
FIG. 6A is a cross-sectional view taken along line I-I' and line II-II' of FIG. 5.
Figure 6B:
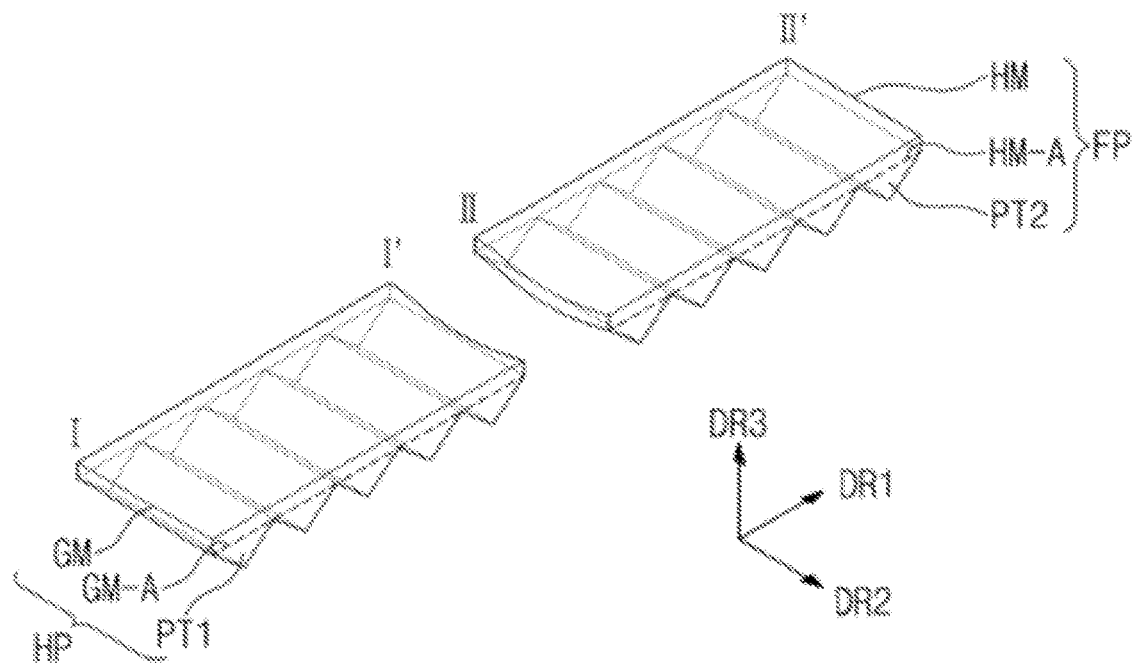
FIG. 6B is a perspective view of an exemplary embodiment of a diffusion pattern part of a light guide plate of the display device of FIG. 1.

FIG. 6A is a view continuously illustrating a cross-sectional view of the diffusion pattern part HP taken along line I-I' of FIG. 5 and a cross-sectional view of the functional pattern part FP taken along line of FIG. 5. FIG. 6B is a view continuously illustrating a perspective view of the diffusion pattern part HP in FIG. 6A and a perspective view of the functional pattern part FP in FIG. 6A.

Referring to FIGS. 6A and 6B, the diffusion pattern part HP may include a first base layer GM and a plurality of first patterns PT1. A boundary between the first base layer GM and the first patterns PT1 may be defined as a virtual reference surface GM-A. Each of the first patterns PT1 may have a shape protruding from the first base layer GM. For example, each of the first patterns PT1 may have a shape protruding with respect to the reference surface GM-A in the third direction DR3. According to an exemplary embodiment, each of the first patterns PT1 may have a prism shape. The first patterns PT1 are substantially connected to the first base layer GM.

The functional pattern part FP includes a second base layer HM and a plurality of second patterns PT2. A boundary between the second base layer HM and the second patterns PT2 may be defined as a virtual reference surface HM-A. Each of the second patterns PT2 may have a shape protruding from the second base layer HM. For example, each of the second patterns PT2 may have a shape protruding with respect to the reference surface HM-A in the third direction DR3. The second patterns PT2 are substantially connected to the second base layer HM. Each of the second patterns PT2 may have the substantially same shape as each of the first patterns PT1.

Figure 7A:
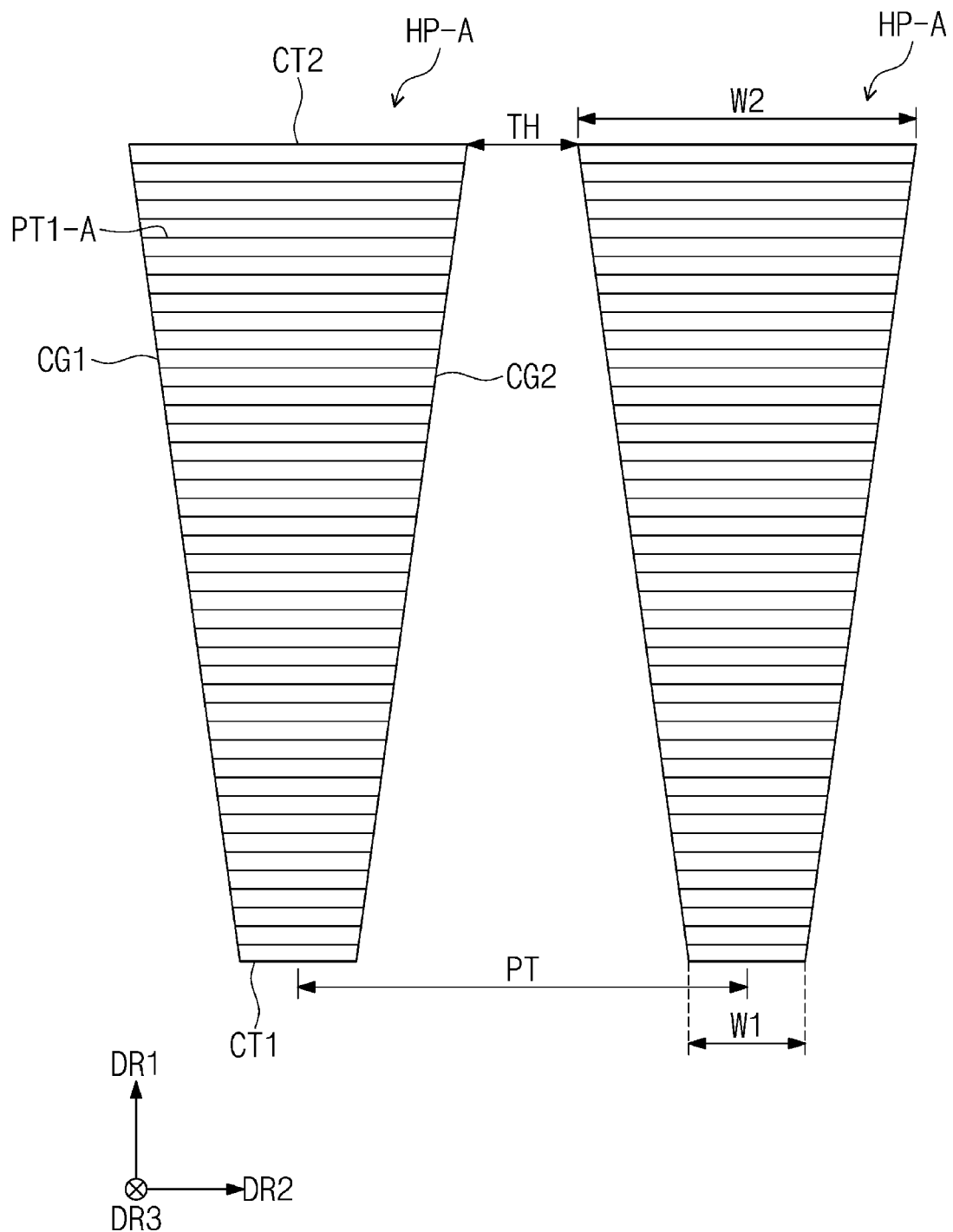
FIGS. 7A and 7B are plan views of other exemplary embodiments of diffusion pattern parts of the light guide plate of the display device of FIG. 1.
Figure 7B:
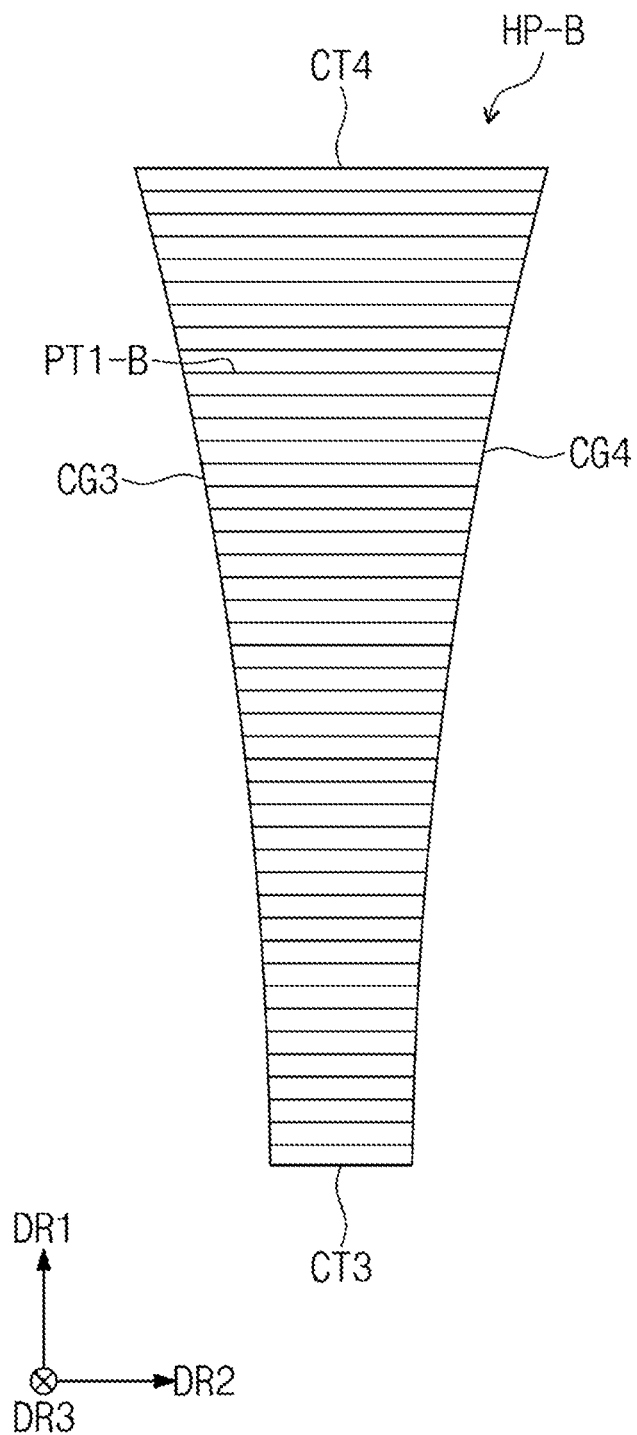

FIGS. 7A and 7B are plan views illustrating a diffusion pattern part according to an exemplary embodiment. The same components as those in FIGS. 1 to 6B will be designated by the same reference numerals, and overlapped description thereof will be omitted. FIGS. 7A and 7B illustrate a rear surface of the diffusion pattern part for convenience of explanation.

FIG. 7A illustrates two diffusion pattern parts adjacent to each other. A diffusion pattern part HP-A according to an exemplary embodiment has a first lateral surface CT1 extending in the second direction DR2, a second lateral surface CT2 facing the first lateral surface CT1, and third and fourth lateral surfaces CG1 and CG2 connecting the first lateral surface CT1 and the second lateral surface CT2. In an exemplary embodiment, the first lateral surface CT1 may be defined as a surface adjacent to the light incident surface S1 (refer to FIG. 1), and the second lateral surface CT2 may be defined as a surface adjacent to the light facing surface S2 (refer to FIG. 1).

The first lateral surface CT1 and the second lateral surface CT2 according to an exemplary embodiment may have different widths from each other in the second direction DR2. For example, a first width W1 of the first lateral surface CT1 in the second direction DR2 may be less than a second width W2 of the second lateral surface CT2 in the second direction DR2. The third and fourth lateral surfaces CG1 and CG2 connect the first lateral surface CT1 and the second lateral surface CT2, and the diffusion pattern part HP-A may have a tapered shape. In an exemplary embodiment, the first width W1 of the first lateral surface CT1 may be about 10 μm, and the second width W2 of the second lateral surface CT2 may be about 370 μm.

As the first lateral surface CT1 and the second lateral surface CT2 have the different widths in the second direction DR2, a width (e.g., in the second direction DR2) of each of first patterns PT1-A contained in the pattern part HP-A may be changed in correspondence to a shape of each of the third and fourth lateral surfaces CG1 and CG2 of the diffusion pattern part HP-A. Thus, the width (e.g., in the second direction DR1) of the first pattern adjacent to the first lateral surface CT1 may be less than the width (e.g., in the second direction DR2) of the first pattern adjacent to the second lateral surface CT2.

According to an exemplary embodiment, a minimum width TH between spaced diffusion patterns may be defined in an area in which the second lateral surfaces of the diffusion pattern parts HP-A face each other. The minimum width TH according to an exemplary embodiment may be about 30 μm. A pitch PC between the spaced diffusion patterns may be about 400 μm.

Referring to FIG. 7B, unlike the third and fourth lateral surfaces CG1 and CG2 of FIG. 7A, each of third and fourth lateral surfaces CG3 and CG4 of a diffusion pattern part HP-B according to an exemplary embodiment may include a curved surface having a curvature radius that gradually decreases as moving in the first direction DR1.

As a first lateral surface CT2 and a second lateral surface CT4 of the diffusion pattern part HP-B have different widths in the second direction DR2, a width (e.g., in the second direction DR2) of each of first patterns PT1-B contained in the diffusion pattern part HP-B may be changed in correspondence to a shape of each of the third and fourth lateral surfaces CG3 and CG4 of the diffusion pattern part HP-B. Thus, the width (e.g., in the second direction DR2) of the first pattern adjacent to the first lateral surface CT3 may be less than that in the second direction DR2 of the first pattern adjacent to the second lateral surface CT4.

According to the exemplary embodiment, a width of the pattern adjacent to the light facing surface S2 (refer to FIG. 1) may be greater than that of the pattern adjacent to the light incident surface S1 (refer to FIG. 1) among the first patterns PT1-A and PT1-B of the diffusion pattern parts HP-A and HP-B. As the wiidth of the pattern increases, a probability that the light provided from the light source LS is reflected by the pattern, may be increased. Thus, a light output efficiency of an area adjacent to the light facing surface S2 may increase. Thus, light provided to the display panel DP (refer to FIG. 1) may have uniform luminance, and a display quality of the display device EA (refer to FIG. 1) may improve.

Figure 8A:
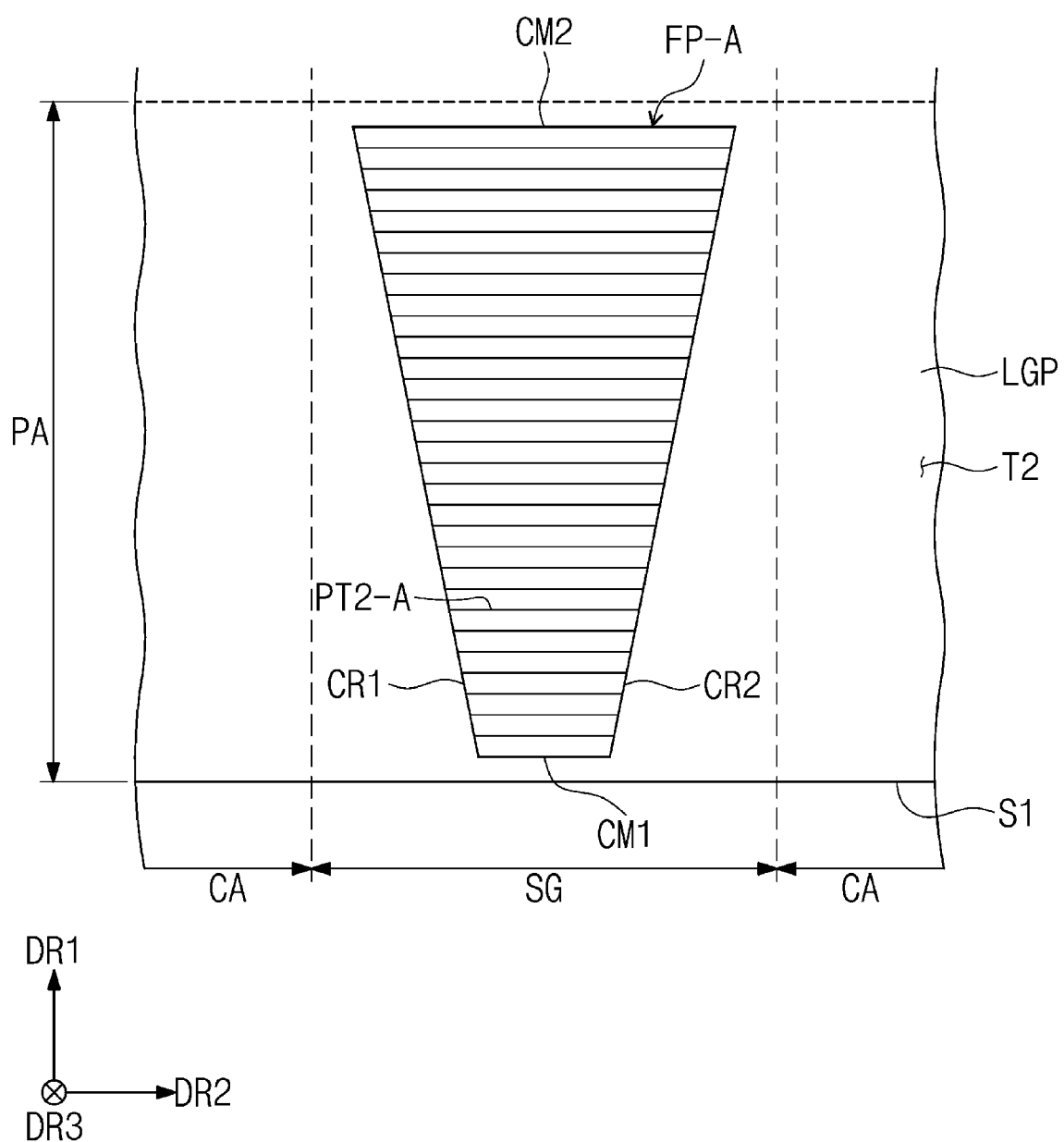
FIGS. 8A, 8B, 8C, and 8D are plan views of exemplary embodiments of functional pattern parts of the light guide plate of the display device of FIG. 1.
Figure 8B:
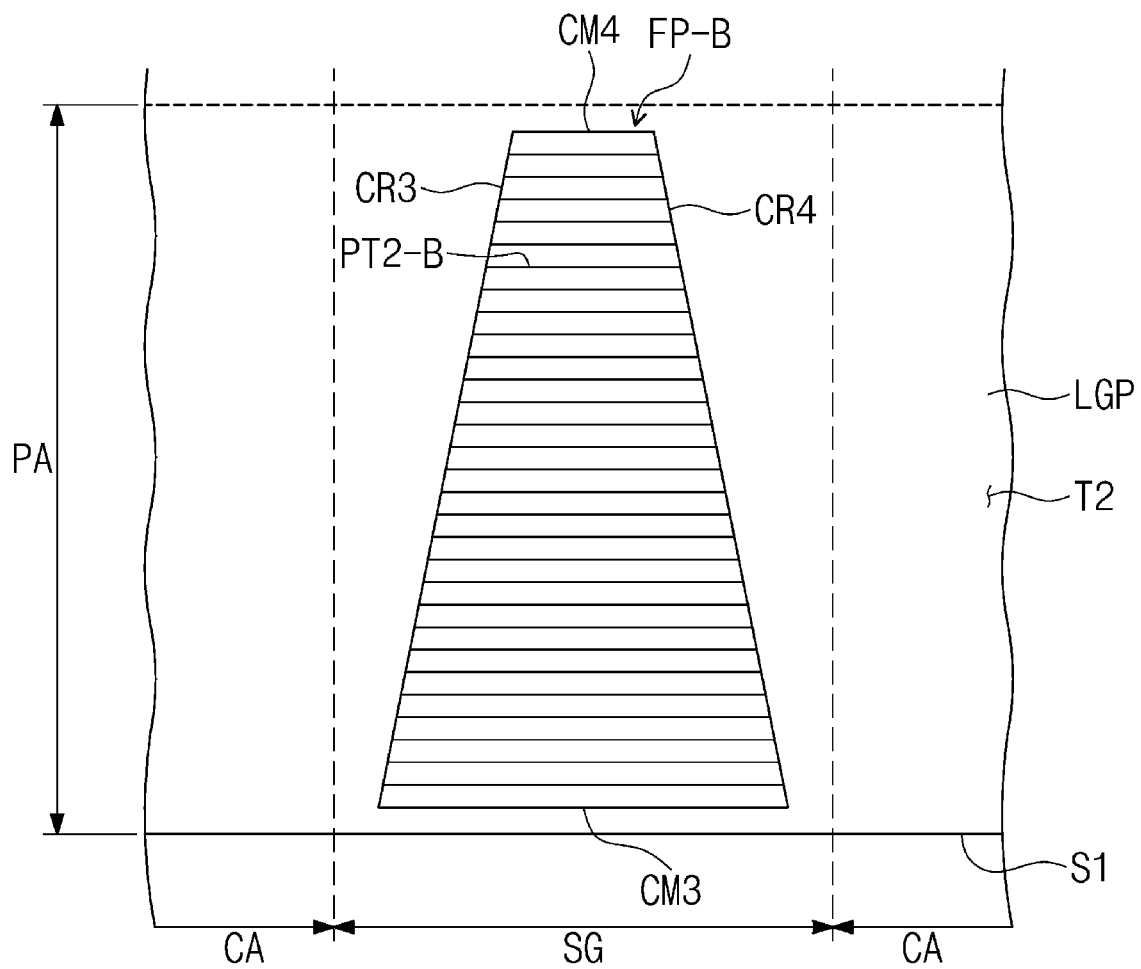

FIGS. 8A and 8B are plan views illustrating a functional pattern part according to an exemplary embodiment. The same components as those in FIGS. 1 to 6B will be designated by the same reference numerals, and overlapped description thereof will be omitted for descriptive convenience. FIGS. 8A and 8B illustrate a rear surface of the functional pattern part for convenience of explanation.

Referring to FIG. 8A, a functional pattern part FP-A according to an exemplary embodiment includes a first lateral surface CM1 extending in the second direction DR2, a second lateral surface CM2 facing the first lateral surface CM1, and third and fourth lateral surfaces CR1 and CR2 connecting the first lateral surface CM1 and the second lateral surface CM2. In an exemplary embodiment, the first lateral surface CM1 may be defined as a surface relatively closer to a light incident surface S1 than the second lateral surface CM2.

The first lateral surface CM1 and the second lateral surface CM2 according to an exemplary embodiment may have different widths from each other in the second direction DR2. For example, the width (e.g., in the second direction DR2) of the first lateral surface CM1 may be less than that in the second direction DR2 of the second lateral surface CM2. The third and fourth lateral surfaces CR1 and CR2 connect the first lateral surface CT1 and the second lateral surface CT2, and the functional pattern part FP-A may have a tapered shape. Thus, a width (e.g., in the second direction DR2) of each of second patterns PT2-A of the functional pattern part FP-A may gradually increase as moving in the first direction DR1. For example, each of the third and fourth lateral surfaces CR1 and CR2 of the functional pattern part FP-A according to an exemplary embodiment may include a curved surface.

Referring to FIG. 8B, unlike FIG. 8A, a width (e.g., in the second direction DR2) of a first lateral surface CM3 of a functional pattern part FP-B may be greater than a width (e.g., in the second direction DR2) of a second lateral surface CM4. Third and fourth surfaces CR3 and CR4 may connect the first lateral surface CM3 and the second lateral surface CM4, and the functional pattern part FP-B may have a tapered shape. Thus, a width (e.g., in the second direction DR2) of each of second patterns PT2-B of the functional pattern part FP-B may gradually decrease as moving in the first direction DR1.

Figure 8C:
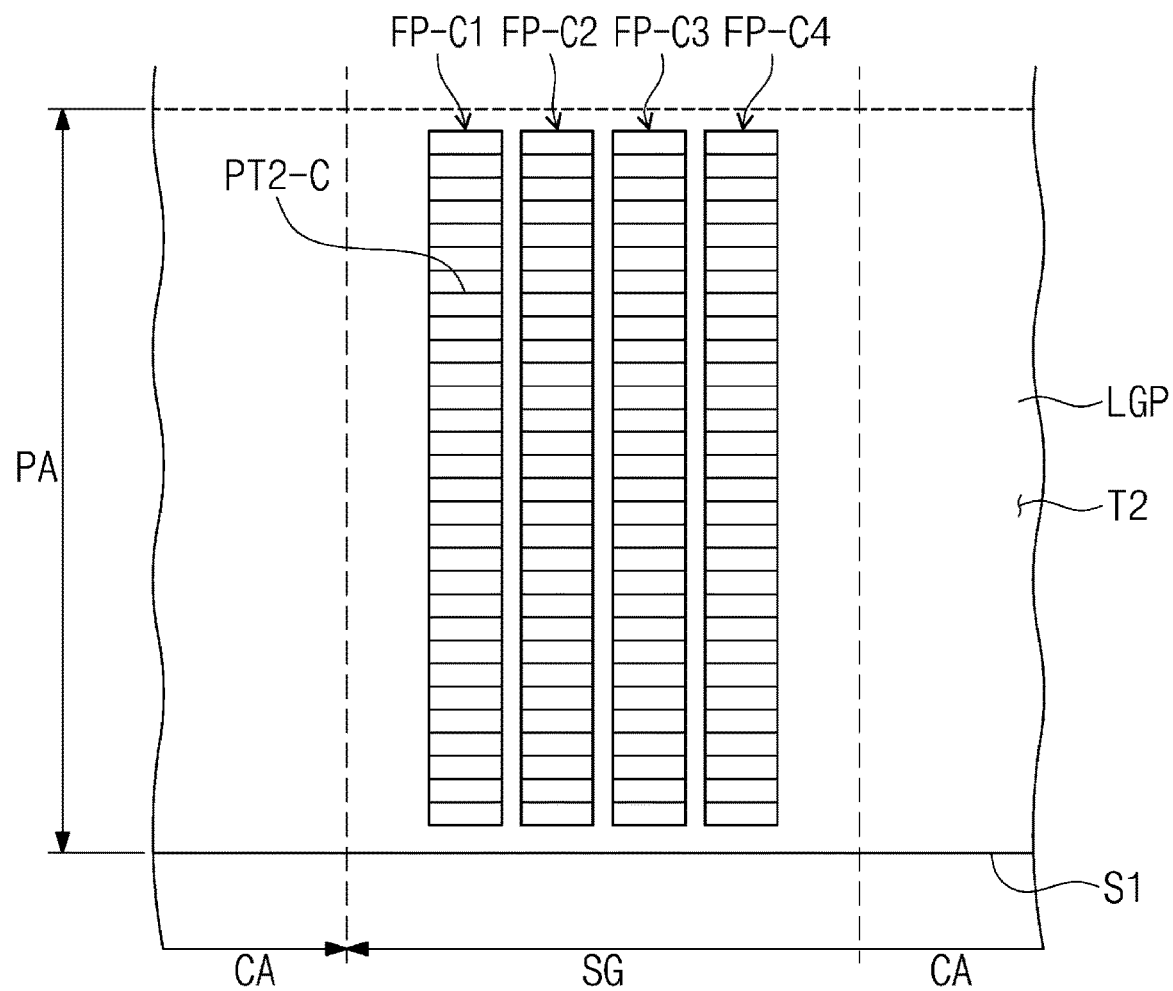

Referring to FIG. 8C, a plurality of functional pattern parts FP-C1, FP-C2, FP-C3, and FP-C4 may be disposed in a first area SG overlapping an area between adjacent light sources. According to an exemplary embodiment, the functional pattern parts FP-C1, FP-C2, FP-C3, and FP-C4 may each extend in the first direction DR1 and be spaced apart from each other in the second direction DR2.

Each of the functional pattern parts FP-C1, FP-C2, FP-C3, and FP-C4 includes a plurality of second patterns PT2-C each extending in the second direction DR2 and arranged in the first direction DR1.

Figure 8D:
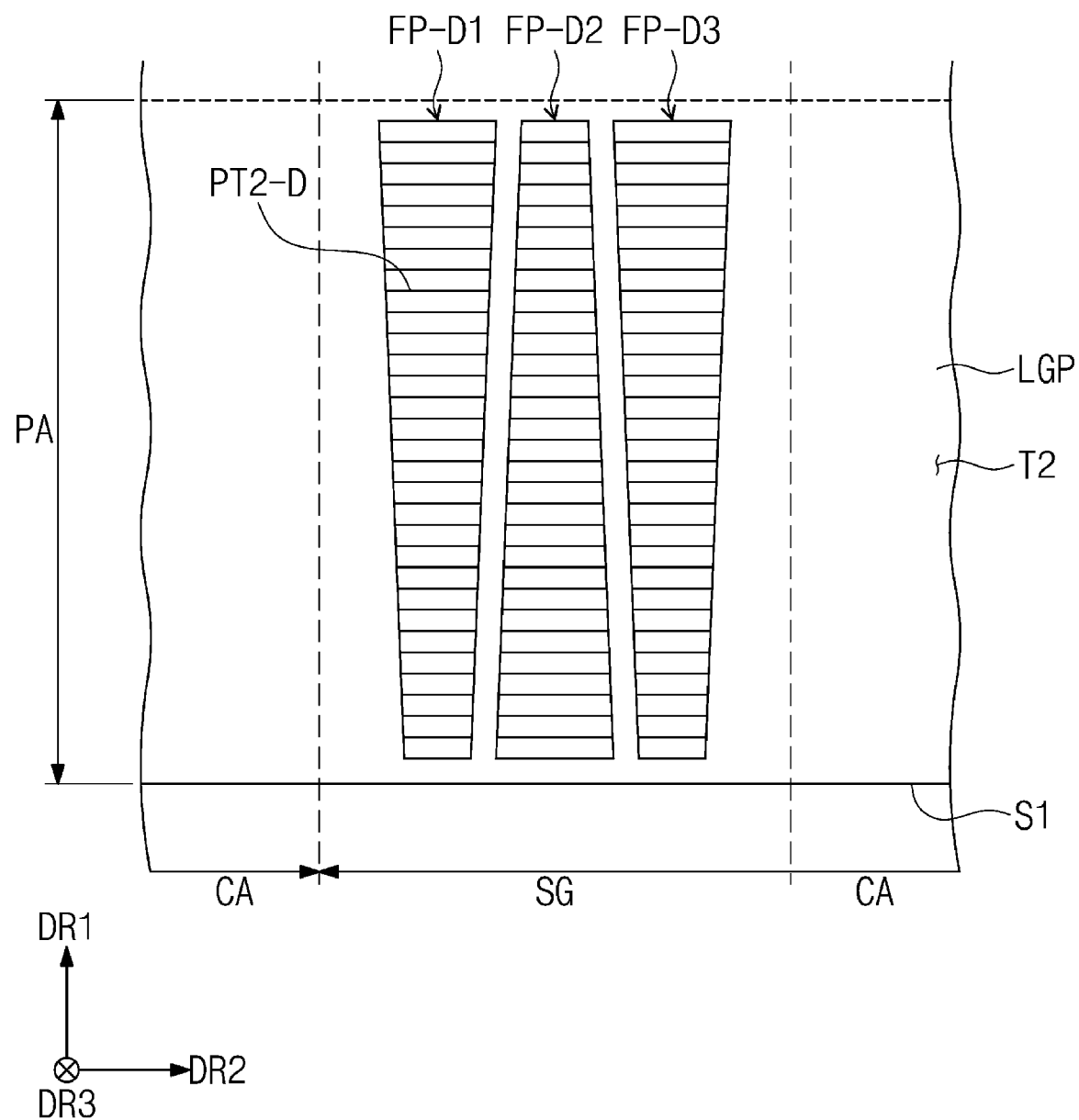

Referring to FIG. 8D, a plurality of functional pattern parts FP-D1, FP-D2, and FP-D3 may be disposed in a first area SG overlapping an area between adjacent light sources. According to an exemplary embodiment, first, second, and third functional pattern parts FP-D1, FP-D2, and FP-D3 may each extend in the first direction DR1 and be spaced apart from each other in the second direction DR2.

Unlike FIG. 8C, each of the first and third functional pattern parts FP-D1 and FP-D3 may have a tapered shape in which a width (e.g., in the second direction DR2) of first patterns PT2-D gradually increases as moving in a direction away from a light incident surface S1. The second functional pattern part FP-D2 may have a tapered shape in which a width (e.g., in the second direction DR2) of first patterns PT2-D gradually decreases as moving in a direction away from the light incident surface S1. According to an exemplary embodiment, the first and third functional pattern parts FP-D1 and FP-D3 may be spaced apart from each other with the second functional pattern part FP-D2 therebetween. Although three functional pattern parts FP-D1, FP-D2, and FP-D3 are illustrated in FIG. 8D, exemplary embodiments are not limited thereto. For example, two or four or more functional pattern parts each having alternate tapered shapes may be disposed, but exemplary embodiments are not limited thereto.

Figure 9A:
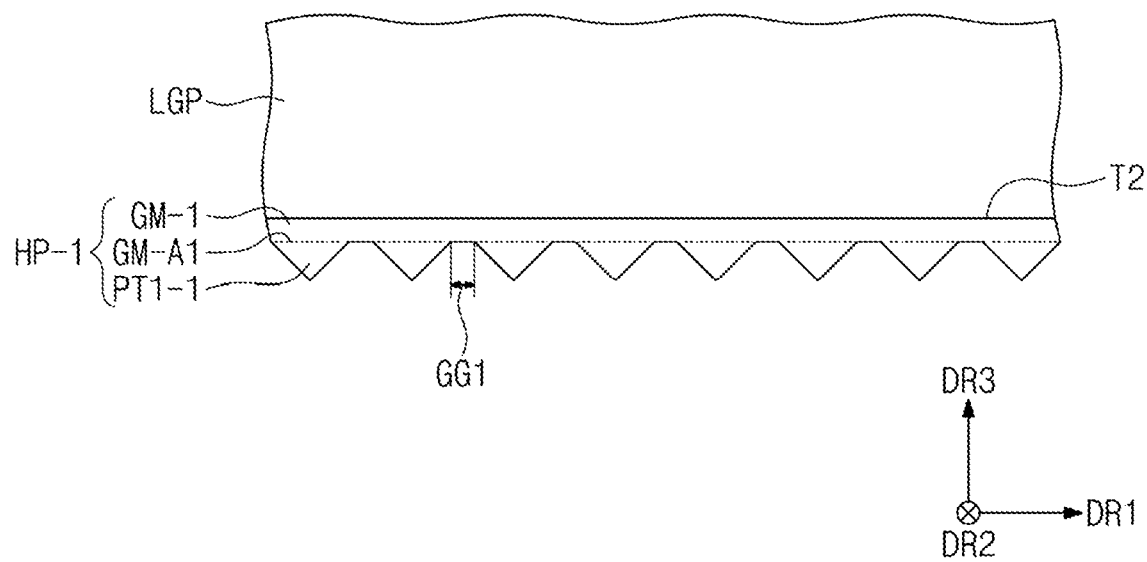
FIGS. 9A, 9B, and 9C are cross-sectional views of other exemplary embodiments of the display device of FIG. 1.
Figure 9B:
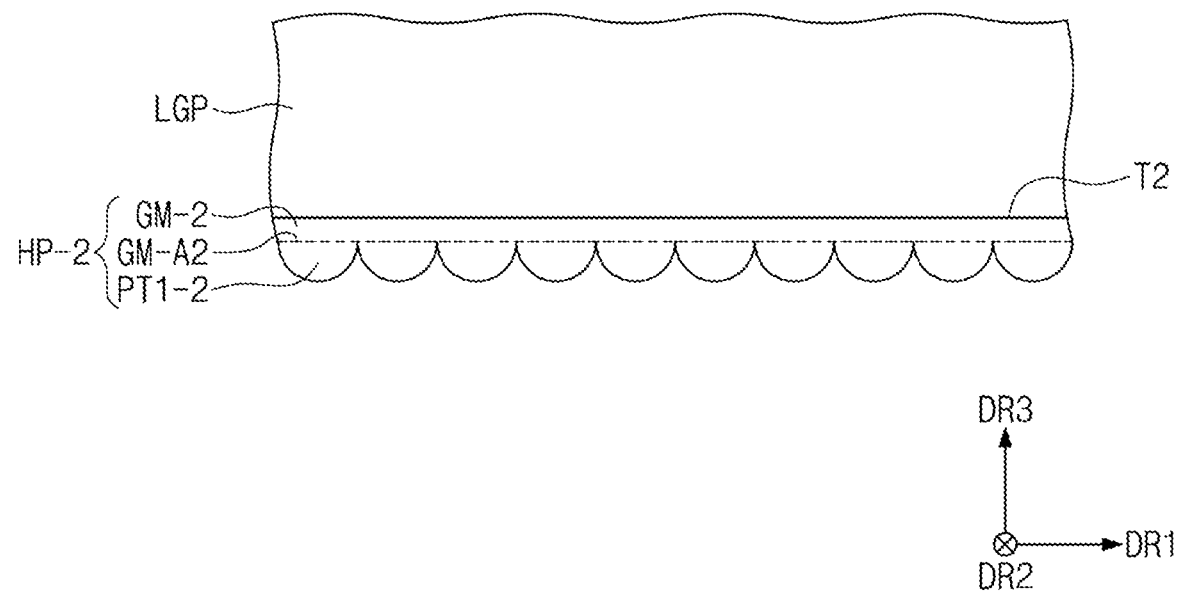
Figure 9C:
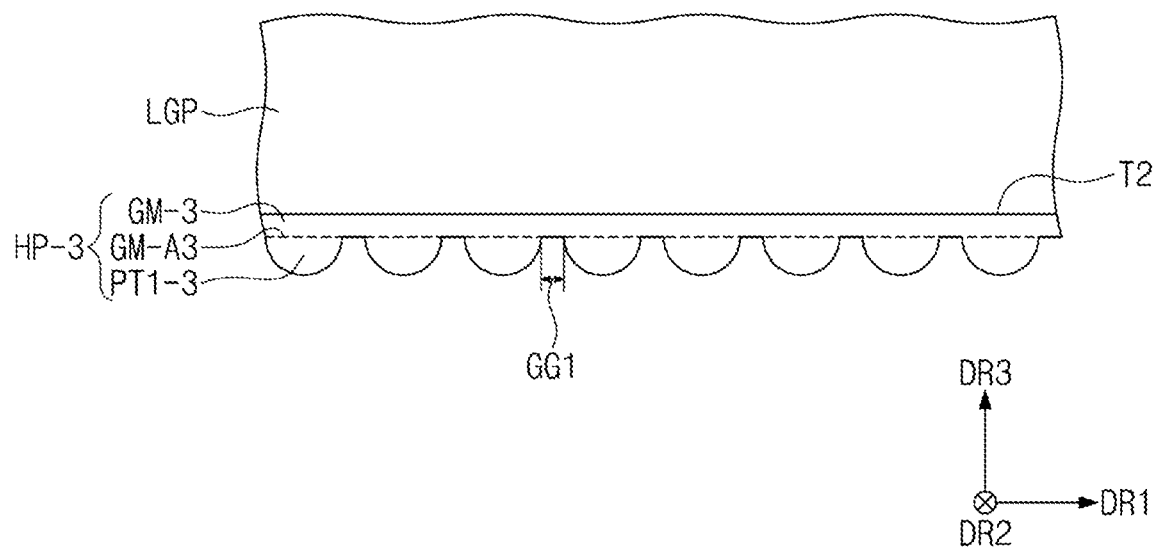

FIGS. 9A, 9B, and 9C are cross-sectional views of the display device according to an exemplary embodiment. Although exemplary embodiments of the diffusion pattern part are illustrated in FIGS. 9A, 9B, and 9C, a shape of the diffusion pattern part in FIGS. 9A, 9B, and 9C may be equally applied to that of the functional pattern part.

Referring to FIG. 9A, a diffusion pattern part HP-1 may include a first base layer GM-1 and first patterns PT1-1. A boundary between the first base layer GM-1 and the first patterns PT1-1 may be defined as a virtual reference surface GM-A1.

The first patterns PT1-1 are arranged in the first direction DR1. Each of the first patterns PT1-1 may have a shape protruding in the third direction DR3 with respect to the reference surface GM-A1 from the first base layer GM-1. According to an exemplary embodiment, each of the first patterns PT1-1 may have a prism shape. The first patterns PT1-1 are substantially connected to the first base layer GM-1.

The first patterns PT1-1 of the diffusion pattern part HP-1 according to an exemplary embodiment may be spaced a predetermined gap GG1 from each other. Thus, a portion of the first base layer GM-1 between adjacent first patterns PT1-1 may be exposed.

Referring to FIG. 9B, a diffusion pattern part HP-2 may include a first base layer GM-2 and first patterns PT1-2. A boundary between the first base layer GM-2 and the first patterns PT1-2 may be defined as a virtual reference surface GM-A2.

The first patterns PT1-2 are arranged in the first direction DR1. Each of the first patterns PT1-2 may have a shape protruding in the third direction DR3 with respect to the reference surface GM-A2 from the first base layer GM-2. According to an exemplary embodiment, each of the first patterns PT1-2 may have a semicircular shape. The first patterns PT1-2 are substantially connected to the first base layer GM-2.

Referring to FIG. 9C, a diffusion pattern part HP-3 includes a first base layer GM-3 and first patterns PT1-3. A boundary between the first base layer GM-3 and the first patterns PT1-3 may be defined as a virtual reference surface GM-A3.

The first patterns PT1-3 are arranged in the first direction DR1. Each of the first patterns PT1-3 may have a shape protruding in the third direction DR3 with respect to the reference surface GM-A3 from the first base layer GM-3. According to an exemplary embodiment, each of the first patterns PT1-3 may have a semicircular shape. The first patterns PT1-3 are substantially connected to the first base layer GM-3.

The first patterns PT1-3 of the diffusion pattern part HP-3 according to an exemplary embodiment may be spaced a predetermined gap GG2 from each other. Thus, a portion of the first base layer GM-3 between adjacent first patterns PT1-3 may be exposed.

Figure 10A:
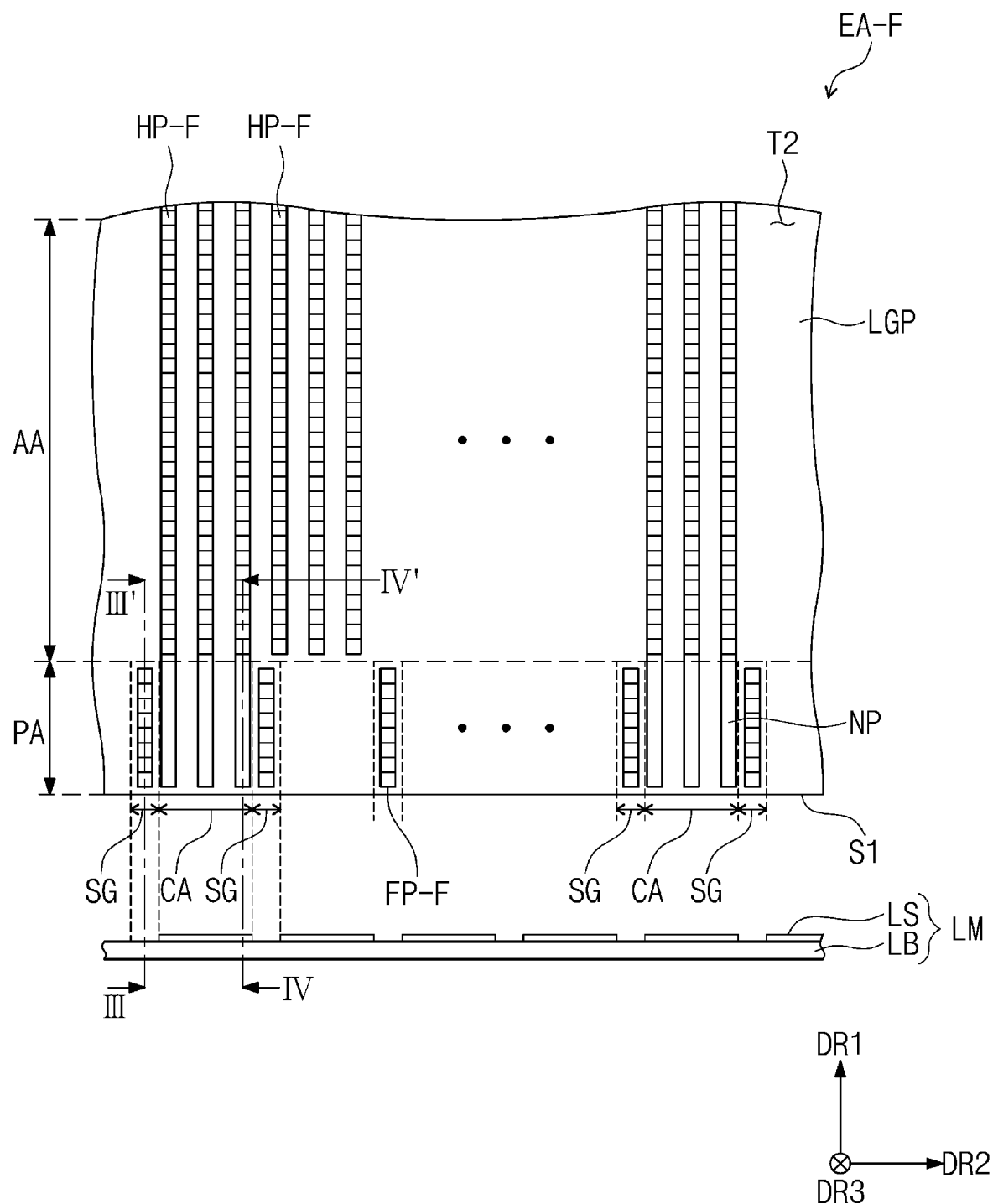
FIG. 10A is a rear view of another exemplary embodiment of the display device of FIG. 1.
Figure 10B:
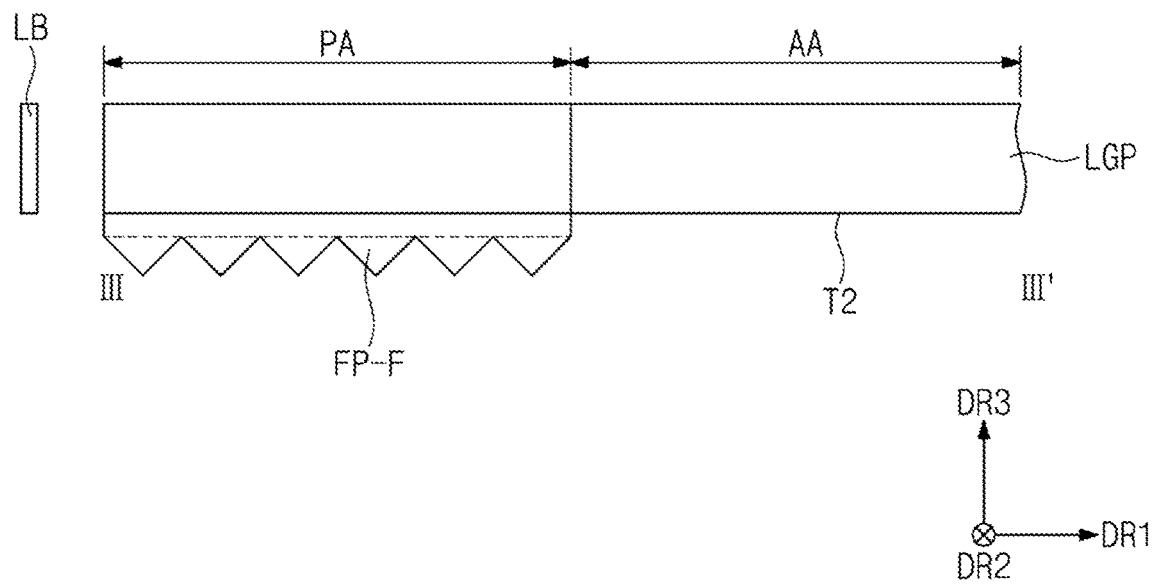
FIG. 10B is a cross-sectional view taken along line of FIG. 10A.

FIG. 10A is a rear view of a display device according to an exemplary embodiment. FIG. 10B is a cross-sectional view taken along line of FIG. 10A. FIG. 10B is a cross-sectional view taken along line IV-IV' of FIG. 10A. The same components as those in FIGS. 1 to 6B will be designated by the same reference numerals, and overlapped description thereof will be omitted.

A display device EA-F according to an exemplary embodiment further includes a normal pattern part NP disposed on a bottom surface T2 of a light guide plate LGP. The normal pattern part NP is disposed in a pattern area PA of the bottom surface T2. The normal pattern part NP may overlap a light source LS when viewed in the first direction DR1 from a light source part LM to a light incident surface S1. The normal pattern part NP may extend from at least one diffusion pattern part HP-F of a plurality of diffusion pattern parts and be disposed in the pattern area PA. The normal pattern part NP may be disposed between a plurality of functional pattern parts. Thus, the normal pattern part NP may overlap a second area CA and may not overlap a first area SG when viewed in the first direction from the light source part LM to the light incident surface S1.

FIG. 10B is a cross-sectional view illustrating a pattern area PA in which a functional pattern part FP-F is disposed and an activation area AA in which a diffusion pattern part HP-P is not disposed. As the diffusion pattern part HP-P is not disposed in the activation area AA, a bottom surface T2 of a light guide plate LBP may be exposed. For example, the bottom surface T2 of an area, in which the diffusion pattern part HP-P is disposed, of the activation area AA may be covered by the diffusion pattern part HP-P.

Figure 10C:
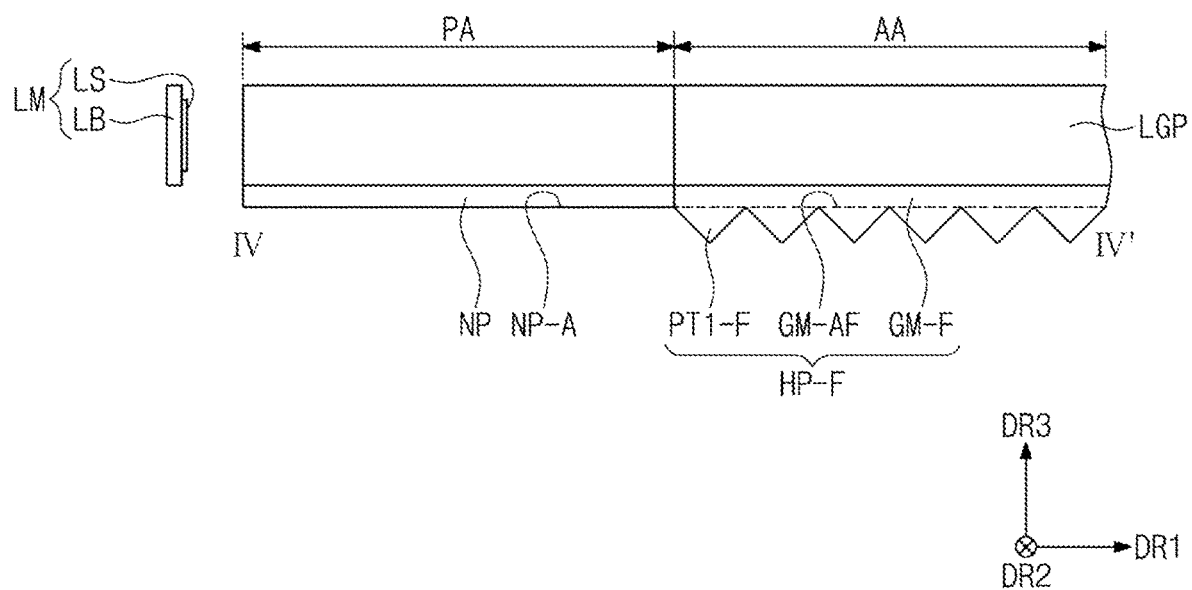
FIG. 10C is a cross-sectional view taken along line IV-IV' of FIG. 10A.

Referring to FIG. 10C, a normal pattern part NP may include a flat surface NP-A defining the same plane as a reference surface GM-F of a diffusion pattern part HP_F. The normal pattern part NP may be obtained by removing first patterns PT1-F of the diffusion pattern part HP_F.

A cross-section of each of a pattern area PA in which the normal pattern part NP is disposed and an activation area AA in which the diffusion pattern part HP-F connected to the normal pattern part NP is disposed is illustrated. As the diffusion pattern part HP_F is disposed in the activation area AA, a bottom surface T2 of a light guide plate LBP may be covered.

According to an exemplary embodiment, a functional pattern part FP-F including protruding patterns may be disposed in one area of the light guide plate LGP facing an area between light sources LS, and the normal pattern part NP, which does not include the protruding patterns, may be disposed in one area of the light guide plate LGP facing the light sources LS. Light provided to the area facing the area between the light sources LS may be vertically outputted by the patterns of the functional pattern part FP-F, and light provided to the normal pattern part NP may not be vertically outputted (e.g., the third direction DR3). As the light is vertically outputted by the functional pattern part FP-F (e.g., the third direction DR3), the area facing the area between the light sources LS may have relatively improved luminance, and as the light is not vertically outputted by the normal pattern part NP, the area facing the light sources LS may have relatively reduced luminance. Thus, a luminance difference between the area facing the light sources LS and the area facing the area between the light sources LS may be reduced. For example, according to an exemplary embodiment, the hot-spot phenomenon in which the area facing the light sources LS is brightly recognized may improve.

It will be apparent to those skilled in the art that various modifications and variations can be made in the present invention. Thus, it is intended that the present disclosure covers the modifications and variations of this invention provided they come within the scope of the appended claims and their equivalents.

Hence, the real protective scope of the present invention shall be determined by the technical scope of the accompanying claims.

The present invention may provide a display device which improves a hot-spot phenomenon generated between light sources and from which an optical sheet is omitted and thus have high industrial applicability.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A backlight unit comprising:
a light guide plate having a light exit surface through which light is outputted, a bottom surface opposed to the light exit surface, a light incident surface connecting the bottom surface and the light exit surface, a light facing surface opposed to the light incident surface, first and second side surfaces connecting the light incident surface and the light facing surface and opposed to each other, wherein the bottom surface comprises an activation area and a pattern area adjacent to the activation area;
a light source part comprising a plurality of light sources configured to provide light to the light incident surface and spaced apart from each other in one direction;
a diffusion pattern part disposed in the activation area and comprising a plurality of first patterns, each of the first patterns extending in one direction on the bottom surface and arranged in a cross direction intersecting the one direction; and
a functional pattern part disposed in the pattern area and comprising a plurality of second patterns,
wherein each of the second patterns extends in the one direction and is arranged in the cross direction, wherein each of the first patterns and the second pattern parts has a protrusion portion protruding in a direction away from the bottom surface and a recessed portion recessed in a direction toward the bottom surface, and the recessed portion of each of the first patterns and the second pattern parts is opened in the one direction and substantially parallel to the bottom surface.

2. The backlight unit of claim 1, wherein the functional pattern part does not overlap the light sources when viewed in the cross direction from the light source part to the light incident surface.

3. The backlight unit of claim 2, wherein widths of the second patterns in the one direction gradually increase or decrease as moving in the cross direction.

4. The backlight unit of claim 3, wherein:
the functional pattern part is provided in plurality in one of spaces between the light sources, and
among the functional pattern parts, a first functional pattern part, in which the widths of the second patterns in the one direction gradually increase as moving in the cross direction, and a second functional pattern part, in which the widths of the second patterns in the one direction gradually decrease as moving in the cross direction, are alternately arranged.

5. The backlight unit of claim 1, wherein the functional pattern part has a first lateral surface adjacent to the light incident surface, a second lateral surface opposed to the first lateral surface and adjacent to the light facing surface, and third and fourth lateral surfaces connecting the first lateral surface and the second lateral surface, and
each of the third and fourth lateral surfaces comprises a curved surface.

6. The backlight unit of claim 1, further comprising a normal pattern part disposed in the pattern area and extending from the diffusion pattern part,
wherein the normal pattern part has a flat surface parallel to a reference surface.

7. The backlight unit of claim 6, wherein the protrusion portion of each of the first patterns has one of an elliptical shape and a triangular shape.

8. The backlight unit of claim 7, wherein each of the second patterns has a substantially same shape as each of the first patterns.

9. A display device comprising:
a display panel configured to display an image;
a backlight unit comprising:
a light guide plate having a light exit surface facing the display panel, a bottom surface opposed to the light exit surface, a light incident surface connecting the bottom surface and the light exit surface, and a light facing surface opposed to the light incident surface; and
a light source part comprising a plurality of light sources configured to provide light to the light incident surface and spaced apart from each other, wherein the bottom surface comprises an activation area adjacent to the light facing surface and a pattern area adjacent to the light incident surface;

diffusion pattern parts disposed in the activation area; and a functional pattern part disposed in the pattern area, wherein the functional pattern part overlaps a space between adjacent light sources when viewed in a first direction from the light source part to the light incident surface, wherein:

each of the diffusion pattern parts and the functional pattern part has a protrusion portion protruding in a direction away from the bottom surface and a recessed portion recessed in a direction toward the bottom surface, and the recessed portion of each of the diffusion pattern parts and the functional pattern part is opened in a second direction intersecting the first direction and substantially parallel to the bottom surface.

10. The display device of claim 9, wherein the functional pattern part is provided in plurality, and the plurality of functional pattern parts overlap the space between the light sources.

11. The display device of claim 9, wherein an overlapped area between the activation area and the display panel is greater than an overlapped area between the pattern area and the display panel in a plan view.

12. The display device of claim 9, wherein each of the diffusion pattern parts comprises a base layer on the bottom surface and a plurality of first patterns, each of the first patterns extending in the first direction and arranged in the second direction intersecting the first direction, wherein each of the first patterns has a protruding shape protruding from a virtual reference surface corresponding to a boundary between the base layer and the first patterns.

13. The display device of claim 12, further comprising a normal pattern part disposed in the pattern area and extending from at least one of the diffusion pattern parts, wherein the normal pattern part has a flat surface parallel to the virtual reference surface.

14. The display device of claim 13, wherein the normal pattern part overlaps the light sources when viewed in the first direction from the light source part to the light incident surface.

15. The display device of claim 12, wherein a width of each of the first patterns in the second direction gradually increases or decreases as moving in a direction from the light incident surface to the light facing surface.

16. The display device of claim 15, wherein:

each of the diffusion pattern parts has a first lateral surface adjacent to the light incident surface, a second lateral surface opposed to the first lateral surface and adjacent to the light facing surface, and third and fourth lateral surfaces connecting the first lateral surface and the second lateral surface, and each of the third and fourth lateral surfaces comprises a curved surface.

17. The display device of claim 12, wherein the protruding shape of each of the first patterns has one of an elliptical shape and a triangular shape.

18. The display device of claim 17, wherein:

the first patterns are spaced by a predetermined gap from each other, and a portion of the base layer between the first patterns is exposed.

19. The display device of claim 18, wherein:

the functional pattern part comprises a plurality of second patterns, and each of the second patterns has a substantially same shape as each of the first patterns.

\* \* \* \* \*